US009560065B2

(12) United States Patent
Neil et al.

(10) Patent No.: US 9,560,065 B2
(45) Date of Patent: Jan. 31, 2017

(54) PATH SCANNING FOR THE DETECTION OF ANOMALOUS SUBGRAPHS AND USE OF DNS REQUESTS AND HOST AGENTS FOR ANOMALY/CHANGE DETECTION AND NETWORK SITUATIONAL AWARENESS

(71) Applicant: Los Alamos National Security, LLC, Los Alamos, NM (US)

(72) Inventors: Joshua Charles Neil, Jemez Springs, NM (US); Michael Edward Fisk, Los Alamos, NM (US); Alexander William Brugh, Santa Fe, NM (US); Curtis Lee Hash, Jr., Santa Fe, NM (US); Curtis Byron Storlie, Jemez Springs, NM (US); Benjamin Uphoff, Los Alamos, NM (US); Alexander Kent, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 190 days.

(21) Appl. No.: 14/382,992

(22) PCT Filed: Mar. 14, 2013

(86) PCT No.: PCT/US2013/031402
§ 371 (c)(1),
(2) Date: Sep. 4, 2014

(87) PCT Pub. No.: WO2013/184206
PCT Pub. Date: Dec. 12, 2013

(65) Prior Publication Data
US 2015/0020199 A1   Jan. 15, 2015

Related U.S. Application Data

(60) Provisional application No. 61/614,148, filed on Mar. 22, 2012.

(51) Int. Cl.
*H04L 29/00* (2006.01)
*H04L 29/06* (2006.01)
(Continued)

(52) U.S. Cl.
CPC ............. *H04L 63/1433* (2013.01); *G06N 5/02* (2013.01); *H04L 1/002* (2013.01);
(Continued)

(58) Field of Classification Search
CPC ..................................... G06F 9/00; G06F 7/00
(Continued)

(56) References Cited

U.S. PATENT DOCUMENTS 6,671,811 B1 * 12/2003 Diep ..................... G06F 21/552
709/223
7,346,803 B2   3/2008 Ide et al.
(Continued)

FOREIGN PATENT DOCUMENTS

EP        2056559 A1   5/2009
JP     2008113409 A    5/2008
(Continued)

OTHER PUBLICATIONS

Final Office Action issued in U.S. Appl. No. 13/826,995, filed Oct. 3, 2014.
(Continued)

*Primary Examiner* — Anthony Brown
*Assistant Examiner* — Michael D Anderson
(74) *Attorney, Agent, or Firm* — LeonardPatel PC

(57) ABSTRACT

A system, apparatus, computer-readable medium, and computer-implemented method are provided for detecting anomalous behavior in a network. Historical parameters of the network are determined in order to determine normal activity levels. A plurality of paths in the network are enumerated as part of a graph representing the network,
(Continued)

where each computing system in the network may be a node in the graph and the sequence of connections between two computing systems may be a directed edge in the graph. A statistical model is applied to the plurality of paths in the graph on a sliding window basis to detect anomalous behavior. Data collected by a Unified Host Collection Agent ("UHCA") may also be used to detect anomalous behavior.

31 Claims, 7 Drawing Sheets

(51) Int. Cl.
  *H04L 1/00* (2006.01)
  *G06N 5/02* (2006.01)
  *G06F 21/57* (2013.01)
(52) U.S. Cl.
  CPC ...... *H04L 63/1408* (2013.01); *H04L 63/1425* (2013.01); *G06F 21/577* (2013.01); *H04L 2463/144* (2013.01)
(58) Field of Classification Search
  USPC .......................................................... 726/23
  See application file for complete search history.

(56) References Cited

U.S. PATENT DOCUMENTS

| | | |
|---|---|---|
| 7,603,711 B2 | 10/2009 | Scheidell |
| 7,627,900 B1 | 12/2009 | Noel et al. |
| 8,077,718 B2 | 12/2011 | Mortier et al. |
| 8,386,377 B1 | 2/2013 | Xiong et al. |
| 8,397,298 B2 | 3/2013 | Macwan et al. |
| 8,434,150 B2 | 4/2013 | Xie et al. |
| 8,448,247 B2 | 5/2013 | Stute |
| 8,588,764 B1 | 11/2013 | Koller et al. |
| 8,627,473 B2 | 1/2014 | Coskun et al. |
| 8,650,630 B2 | 2/2014 | Choyi et al. |
| 2002/0019870 A1 | 2/2002 | Chirashnya et al. |
| 2002/0178383 A1 | 11/2002 | Hrabik et al. |
| 2003/0105976 A1 | 6/2003 | Copeland |
| 2004/0122803 A1 | 6/2004 | Dom et al. |
| 2004/0133672 A1 | 7/2004 | Bhattacharya et al. |
| 2005/0044406 A1 | 2/2005 | Stute |
| 2005/0203881 A1 | 9/2005 | Sakamoto et al. |
| 2006/0053136 A1* | 3/2006 | Ashiri ............... G06F 17/30539 |
| 2006/0253906 A1 | 11/2006 | Rubin et al. |
| 2007/0209074 A1 | 9/2007 | Coffman |
| 2007/0226796 A1 | 9/2007 | Gilbert et al. |
| 2007/0240207 A1 | 10/2007 | Belakhdar et al. |
| 2008/0089233 A1 | 4/2008 | Shimojo et al. |
| 2008/0281771 A1 | 11/2008 | Lai et al. |
| 2009/0024549 A1 | 1/2009 | Johnson |
| 2009/0319659 A1 | 12/2009 | Terasaki et al. |
| 2009/0320137 A1 | 12/2009 | White et al. |
| 2010/0192226 A1 | 7/2010 | Noel et al. |
| 2010/0290346 A1 | 11/2010 | Barford et al. |
| 2011/0141915 A1 | 6/2011 | Choi et al. |
| 2011/0154119 A1 | 6/2011 | Wang et al. |
| 2011/0231937 A1 | 9/2011 | Lippmann et al. |
| 2012/0317644 A1 | 12/2012 | Kumar et al. |
| 2013/0117849 A1 | 5/2013 | Golshan et al. |
| 2013/0127618 A1 | 5/2013 | Sheleheda et al. |
| 2013/0318615 A1 | 11/2013 | Christodorescu et al. |
| 2014/0041028 A1 | 2/2014 | Ramsey et al. |
| 2014/0165207 A1 | 6/2014 | Engel et al. |

FOREIGN PATENT DOCUMENTS

| | | |
|---|---|---|
| JP | 2010511359 A | 4/2010 |
| JP | 2012023629 A | 2/2012 |
| WO | 2008084729 A1 | 7/2008 |
| WO | 2013014672 A1 | 1/2013 |

OTHER PUBLICATIONS

Nirav B. Patel, "Notice of Allowance" issued on Nov. 3, 2014 for U.S. Appl. No. 13/826,995.
Non-Final Office Action issued in U.S. Appl. No. 13/826,736, filed Dec. 24, 2014.
Nirav B. Patel, "Non-Final Office Action", issued on Feb. 4, 2016 for U.S. Appl. No. 14/609,836.
Zachary A. Davis, "Non-Final Office Action" issued on Feb. 16, 2016 for U.S. Appl. No. 14/383,024.
Quy C. Pham, "Notice of Allowance and Fees Due" issued on Mar. 25, 2016 for U.S. Appl. No. 13/826,736.
"A Survey of Coordinated Attacks and Collaborative Intrusion Detection," C.V. Zhou, C. Leckie, and S. Karunasekera, Computers & Security,29(1), pp. 124-140 (2010).
"Alert Correlation in a Cooperative Intrusion Detection Framework," F. Cuppens and A. Miege, Proceedings of the 2002 IEEE Symposium on Security and Privacy, pp. 202-215 (2002).
"Anomaly Detection in Large Graphs," Akoglu et al., CMU-CS-09-173 Technical Report, School of Computer Science of Carnegie Mellon University, Pittsburgh, http://citeseerx.ist.psu.edu/viewdoc/summary?doi=10.1.1.188.2619 (Nov. 2009).
"Bayesian Anomaly Detection Methods for Social Networks," Nicholas A. Heard, David J. Watson, Kiriaki Platanioti, and David J. Hand, Institute of Mathematical Statistics, The Annals of Applied Statistics, vol. 4, No. 2, pp. 645-662 (2010).
"BotMiner: Clustering Analysis of Network Traffic for Protocol-and Structure-Independent Botnet Detection," Guofei Gu, Roberto Perdisci, Junjie Zhang, and Wenke Lee, Proceedings of the 17th Conference on Security Symposium, SS'08, pp. 139-154, Berkeley, CA (2008).
"Botnets: A Survey," S.S.C. Silva, R.M.P. Silva, R.C.G. Pinto, and R.M. Salles, Computer Networking, http://dx.doi.org/10.1016/j.comnet.2012.07.021 (2012).
"Graph Based Statistical Analysis of Network Traffic," Djidjev et al., Proceedings of the Ninth Workshop on Mining and Learning with Graphs, http://csr.lanl.gov/detection/ (Aug. 2011).
"Graph-Based Anomaly Detection in Computer Network Data," Joshua Neil, SIAM Annual Meeting, Denver, Colorado (Jul. 6-10, 2009).
"GraphScan: Scan Statistics for the Detection of Anomalous Paths in a Graph," Joshua Neil, Curtis Storlie, Curtis Hash, Alexander Brugh, and Michael Fisk, 2010 Joint Statistical Meetings, Vancouver, Canada (Aug. 4, 2010).
"GrIDS-A Graph Based Intrusion Detection System for Large Networks," S. Staniford-Chen, S. Cheung, R. Crawford, M. Dilger, J. Frank, J. Hoagland, K. Levitt, C. Wee, R. Yip, and D. Zerkle, Proceedings of the 19th National Information Systems Security Conference, vol. 1, pp. 361-370, Baltimore, MD (1996).
"Identifying Botnets by Capturing Group Activities in DNS Traffic," Hyunsang Choi and Heejo Lee, Computer Networks, 56(1), pp. 20-33, http://dx.doi.org/10.1016/j.comnet.2011.07.018 (Jan. 2012).
"PathScan: Finding the Attacker Within," Joshua Neil, DHS Transition to Practice Demo Day, Washington, DC (Jan. 9, 2013).
"Probabilistic Alert Correlation," A. Valdes and K. Skinner, Recent Advances in Intrusion Detection, vol. 2212, Lecture Notes in ComputerScience, pp. 54-68, Springer Berlin Heidelberg (2001).
"Scan Statistics for the Online Detection of Locally Anomalous Subgraphs," Joshua Neil, Curtis Storlie, Curtis Hash, Alexander Brugh, Michael Fisk, Advanced Computing Solutions, Statistical Sciences Group (CCS-6), Los Alamos National Laboratory, www.stat.lanl.gov/staff/CurtStorlie/pathscan.pdf (Mar. 26, 2012).
"Scan Statistics for the Online Discovery of Anomalous Subgraphs," Joshua Neil, PhD Dissertation Defense at the University of New Mexico (May 3, 2011).
"Scan Statistics for the Online Discovery of Locally Anomalous Subgraphs," PhD Dissertation by Joshua Charles Neil, University of New Mexico, http://repository.unm.edu/handle/1928/13885 (May 2011).
"Scan Statistics on Enron Graphs," Carey E. Priebe, John M. Conroy, David J. Marchette, and Youngser Park, Workshop on Link Analysis, Counterterrorism and Security at the SIAM International Conference on Data Mining, Newport Beach, CA (Apr. 23, 2005).

(56) References Cited

OTHER PUBLICATIONS

"The Link-Prediction Problem for Social Networks," David Liben-Nowell, Jon Kleinberg, Journal of the American Society for Information Science and Technology, 58(7), pp. 1019-1031 (May 2007).
"The Science of Cyber Security LDRD Day 2012 Poster," Joshua Neil, LDRD Day 2012, Pojaque, New Mexico (Oct. 23, 2012).
International Search Report issued in PCT Application No. PCT/US13/31402 on Nov. 22, 2013.
International Search Report issued in PCT Application No. PCT/US13/31463 on Jan. 13, 2014.
Nirav B. Patel, "Non-Final Office Action" issued on Jun. 19, 2014 for U.S. Appl. No. 13/826,995.
Du et al.; Discovering Collaborative Cyber Attack Patterns Using Social Network Analysis; Mar. 2011; Retrieved from the Internet <URL: link.springer.com/chapter/10.1007/978-3-642-19656-0_20#page-1>; pp. 1-8 as printed.
Iliofotou et al.; Exploiting dynamicity in Graph-based Traffic Analysis: Techniques and Applications; Dec. 2009; Retrieved from the Internet <URL: dl.acm.org/citation.cfm?id=1658967>; pp. 1-12 as printed.
Joshua Charles Neil, "Final Office Action", issued on Jun. 18, 2015 for U.S. Appl. No. 13/826,736.
Michael W. Chao, "Non-Final Office Action", issued on Sep. 1, 2015 for U.S. Appl. No. 14/383,024.
Canadian Office Action issued in Appln. Serial No. CA 2,868,054 (corresponds with U.S. Appl. No. 14/382,992) on Oct. 14, 2015.
Joshua Neil et al., "Scan Statistics for the Online Detection of Locally Anomalous Subgraphs," Technometrics, vol. 55, No. 4, pp. 403-414, XP055162176 (Nov. 1, 2013).
Muhammad Qasim Ali et al., "Two-Tier Data-Driven Intrusion Detection for Automatic Generation Control in Smart Grid," IEEE Conference on Communication and Network Security, IEEE, pp. 292-300, XP032714730 (Oct. 29, 2014).
Nirav B. Patel, "Non-Final Office Action" issued on Oct. 7, 2015 for U.S. Appl. No. 14/609,836.
Partial Supplementary European Search Report issued in Appln. Serial No. 13800081.5 (corresponds with U.S. Appl. No. 14/382,992) on Nov. 2, 2015.

Wael Khreich et al., "Adaptive ROC-Based Ensembles of HMMs Applied to Anomaly Detection," Pattern Recognition, vol. 45, No. 1, pp. 208-230, XP28388706 (Jan. 2012).
Extended European Search Report for EP Appln. Serial No. 13800730.7 issued on Nov. 24, 2015.
Hristo Djidjev et al., "Graph Based Statistical Analysis of Network Traffic," Technometrics, XP055162179 (Aug. 1, 2011).
Joshua Neil et al., "Scan Statistics for the Online Detection of Locally Anomalous Subgraphs," Technometrics, vol. 55, No. 4, pp. 403-414 (Nov. 1, 2013).
Extended European Search Report issued in corresponding European Appln. Serial No. 13800081.5 on Jan. 15, 2016.
Khreich et al., "Adaptive ROC-based Ensembles of HMMs Applied to Anomaly Detection," Pattern Recognition, vol. 45, pp. 208-230, XP28388706A (2012).
First Office Action issued in Chinese Appln. Serial No. 201380026043.0 on Jul. 21, 2016 (translation included).
Non-final Office Action issued in U.S. Appl. No. 14/383,024, filed Aug. 22, 2016.
Patent Examination Report No. 1 received from Australian Patent Office in AU Appln. Serial No. 2013272211 on Jun. 22, 2016.
Final Office Action issued in U.S. Appl. No. 14/609,836 on May 16, 2016.
Keisuke Ishibashi et al., "Detecting Anomalies in Inter-Host Communication Pattern," Collection of Papers of Computer Security Symposium 2007 (Oct. 31, 2007). Abstract Translated.
Non-final Office Action issued in Chinese Application No. 201380026239.0 on Sep. 27, 2016.
Non-final Office Action issued in Japanese application No. 2015-501780 on Oct. 25, 2016.
Non-final Office Action issued in Japanese Appln. Serial No. 2015-501782 on Oct. 4, 2016.
Non-final Office Action received in Australian Appln. Serial No. 2013272211 on Sep. 28, 2016.
Notice of Acceptance issued in Australian application No. 2013272211 on Nov. 9, 2016.
Notice of Allowance issued in Canadian application No. 2,868,076 on Nov. 3, 2016.

* cited by examiner

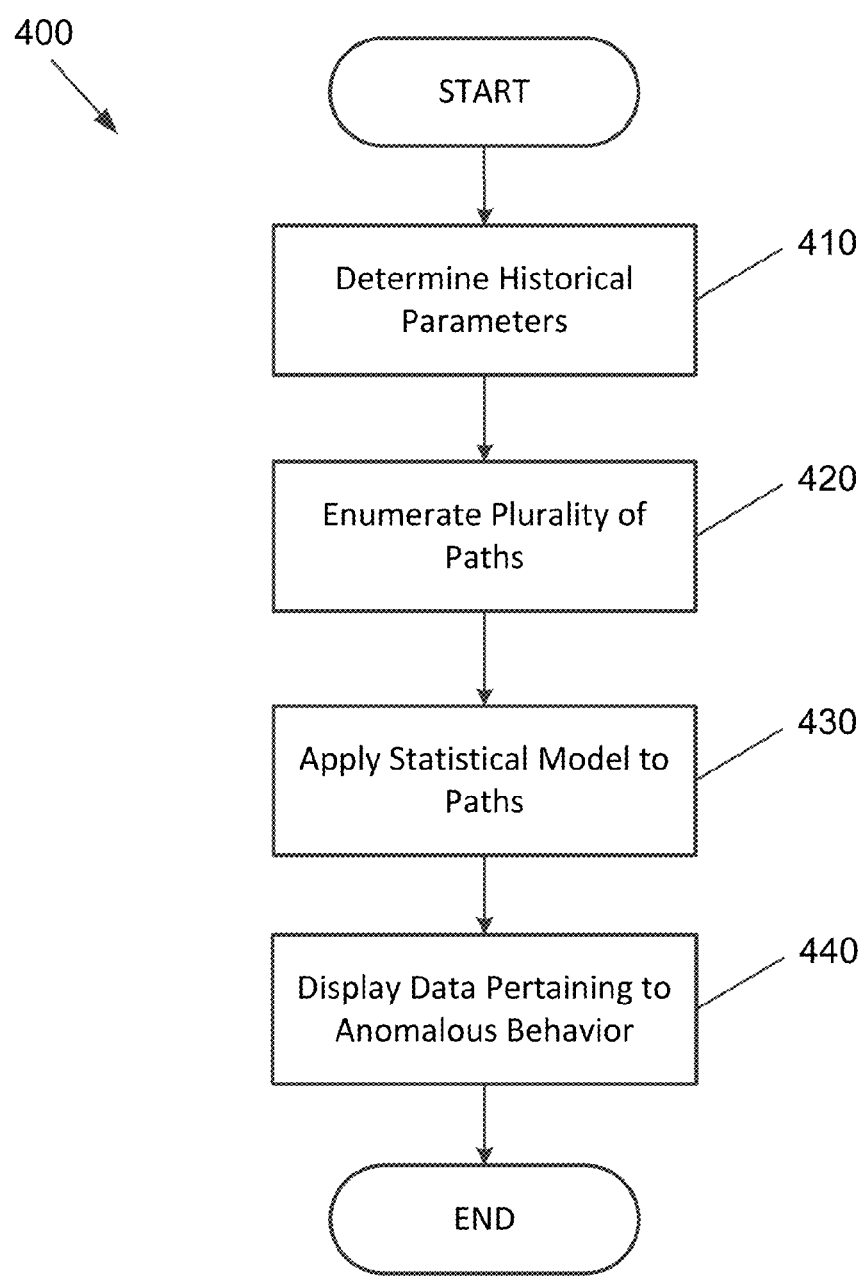

FIG. 5A
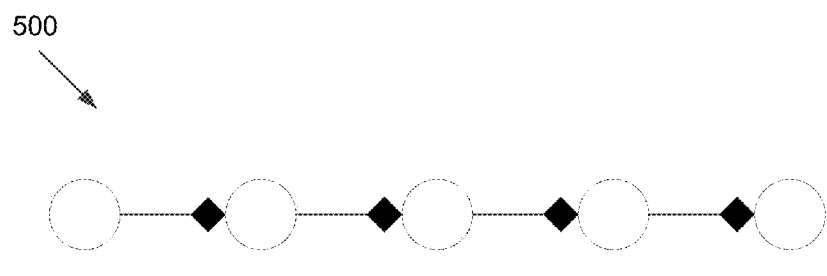
DNS 
UHCA 
FIG. 5B
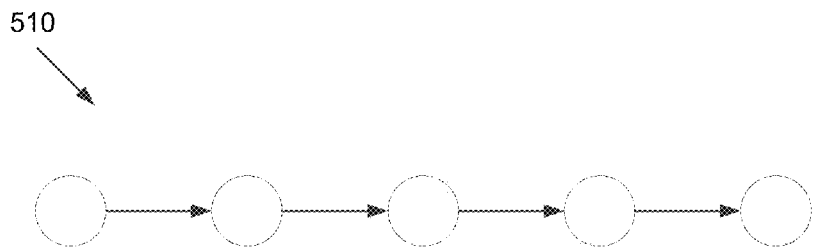
DNS
UHCA 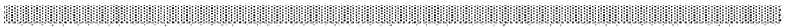

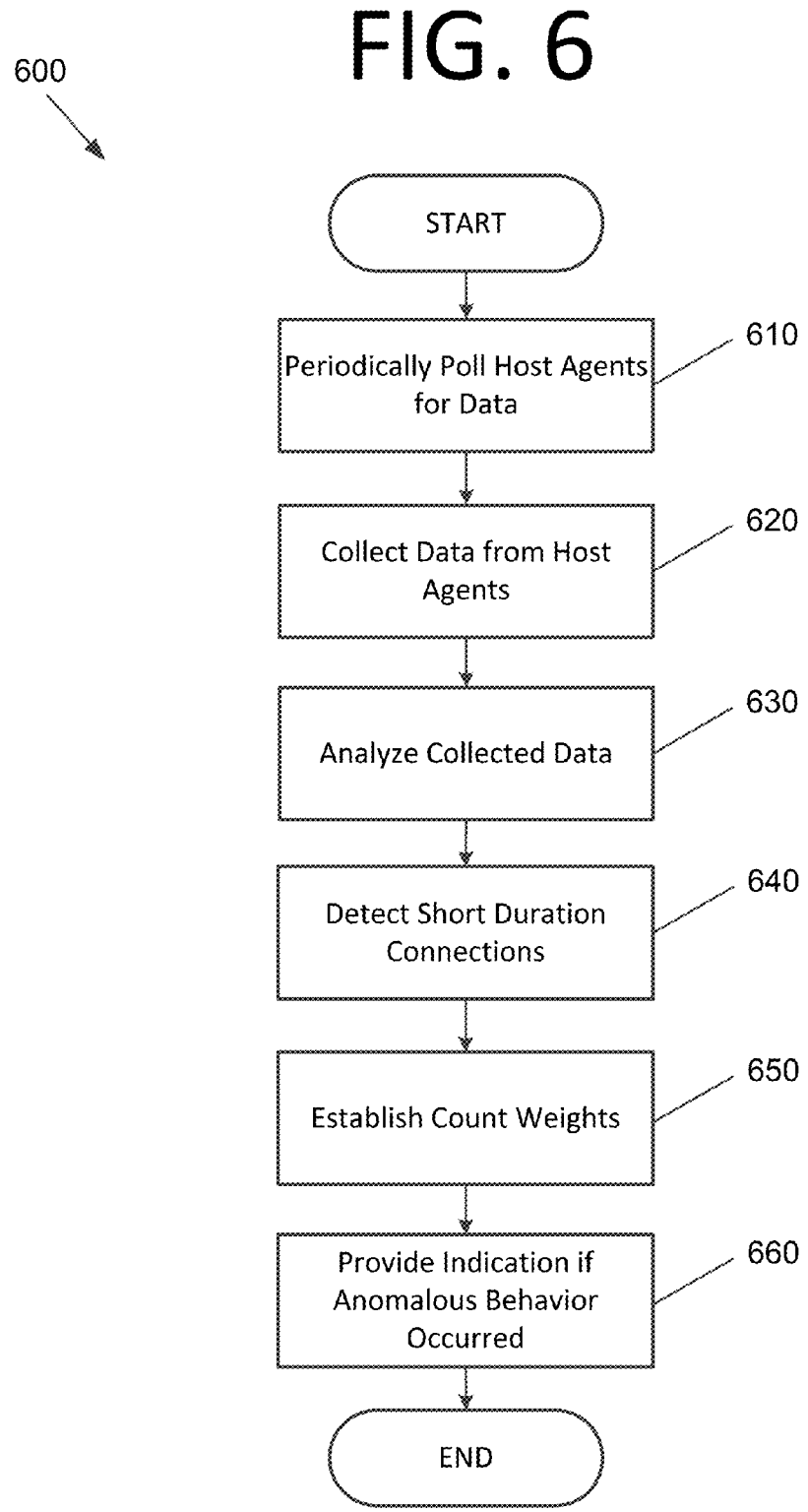

PATH SCANNING FOR THE DETECTION OF ANOMALOUS SUBGRAPHS AND USE OF DNS REQUESTS AND HOST AGENTS FOR ANOMALY/CHANGE DETECTION AND NETWORK SITUATIONAL AWARENESS

CROSS REFERENCE TO RELATED APPLICATIONS

This application is a U.S. national stage application under 35 U.S.C. §371 of PCT Application No. PCT/US13/31402, filed on Mar. 14, 2013, which claims the benefit of U.S. Provisional Application Ser. No. 61/614,148, filed on Mar. 22, 2012. The subject matter of these earlier filed patent applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

BACKGROUND

Field

The present invention generally relates to detecting network intrusions, anomalies, and policy violations, and more particularly, to detecting network intrusions, anomalies, and policy violations by path scanning for the detection of anomalous subgraphs embedded within time-evolving graphs and, additionally relates to the use of Domain Name Service ("DNS") requests for situational awareness and anomaly/change detection on computer networks.

Description of the Related Art

Sophisticated computer hacking presents a serious threat to companies, governmental organizations, and other entities. Generally, a hacker gains entry to a system through automated means. For example, if a hacker sends a phishing email to an organization and a user clicks a link, malware may compromise the machine. This gives the hacker control of the compromised machine, and thus, a foothold into the network in which the compromised machine resides.

The hacker cannot choose which machines are compromised, and thus, where he or she lands in the network. From the initial point where the network was compromised, the hacker commonly traverses the network, searching for additional hosts to exploit. Since no single user generally has access to the entire network, the hacker must traverse through multiple machines to fully compromise the network. Often, a hacker will search for multi-user machines and use the compromised account to gain access—furthering his or her penetration into the network.

Conventional methods for the detection of malicious insiders in a computer network generally do not capture "traversal" well. Traversal occurs when a hacker advances through a network, infiltrating systems, and then using that compromised system to further compromise other hosts. While host-based detection systems that monitor specific machines are somewhat mature, and intrusion detection through a firewall is well-researched, methods that examine multiple hops within the security perimeter simultaneously to search for anomalies are generally not well-explored. Further, network traffic monitoring is generally performed using an elaborate system of network taps, router mirror ports, and router-based flow observation. This approach is costly and fails to provide complete coverage of traffic within a network.

SUMMARY

Certain embodiments of the present invention may provide solutions to the problems and needs in the art that have not yet been fully identified, appreciated, or solved by current intrusion, anomaly, and policy violation detection technologies. For example, some embodiments of the present invention use scan statistics for the detection of locally anomalous subgraphs, using DNS requests that may be used to infer network communications patterns. Some embodiments of the present invention may be applied to any type of graph having time-series data on each edge. Dynamic social network analysis (e.g., Twitter®, Facebook®, email networks, etc.) may be amenable to this kind of analysis, and there may be other graph structures, such as those found in biology, that may be appropriate. As such, some embodiments of the present invention may have applications outside of cyber security.

In an embodiment, a computer-implemented method includes determining historical parameters of baseline statistical models for each "edge" (i.e., a pair of communicating machines) on a network to determine normal activity levels. The computer-implemented method also includes enumerating a plurality of paths in the network as part of a graph representing the network, where each computing system in the network may be a node in the graph and the sequence of connections between two computing systems may be a directed edge in the graph. The method further includes applying these baseline, or statistical, models to paths formed from the edges of the graph under observation on a sliding window basis, and detecting anomalous behavior based on the applied statistical model.

In another embodiment, an apparatus includes at least one processor and memory including instructions. The instructions, when executed by the at least one processor, are configured to cause the at least one processor to determine historical parameters of a network to determine normal activity levels. The instructions are also configured to cause the at least one processor to enumerate a plurality of paths in the network as part of a graph representing the network, where each computing system in the network may be a node in the graph and the sequence of connections between two computing systems may be a directed edge in the graph. The instructions are further configured to cause the at least one processor to apply a statistical model to the graph on a sliding window basis, and detect anomalous behavior based on the applied statistical model.

In yet another embodiment, a system includes memory storing computer program instructions configured to detect anomalous behavior in a network and a plurality of processing cores configured to execute the stored computer program instructions. The plurality of processing cores is configured to determine historical parameters of a network to determine normal activity levels. The plurality of processing cores is also configured to enumerate a plurality of paths in the network as part of a graph representing the network, where each computing system in the network may be a node in the graph and the sequence of connections between two computing systems may be a directed edge in the graph. The plurality of processing cores is further configured to apply a statistical model to the graph on a sliding window basis, and to detect anomalous behavior based on the applied statistical model.

In still another embodiment, a computer-implemented method includes collecting data, by a computing system, from a plurality of host agents pertaining to network communications sent and received by respective hosts in a network. The computer-implemented method also includes analyzing, by the computing system, the collected data to detect anomalous behavior during a predetermined time period, and when anomalous behavior is detected, providing an indication that the anomalous behavior occurred during the predetermined time period.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 4 is a flowchart illustrating a method for detecting anomalous behavior on a network, according to an embodiment of the present invention.

FIG. 5A is a path diagram illustrating a path generated using only name-edges, according to an embodiment of the present invention.

FIG. 5B is a path diagram illustrating a path generated using only IP-edges, according to an embodiment of the present invention.

FIG. 6 is a flowchart of a method for using UHCA to collect data pertaining to anomalies, according to an embodiment of the present invention.

DETAILED DESCRIPTION OF THE EMBODIMENTS

Figure 1A:
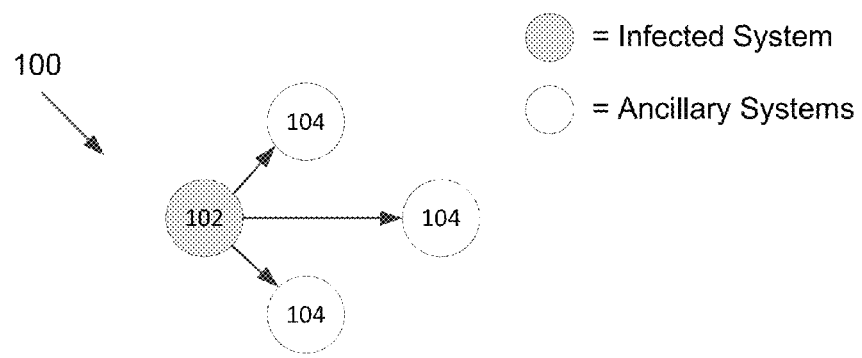
FIG. 1A illustrates a common initial stage of an attack by a hacker.

Some embodiments of the present invention examine paths through a network, where a path is a series of interconnected computing systems that connect to one another. In the graph, a "node" represents a computing system and an "edge" represents a sequence of connections between two computing systems. Examination of paths over time has shown great promise in detecting anomalous actors executing traversal missions in some embodiments. A stochastic model is generally developed for every edge in a network. Statistical tests are performed on the historic parameters of the model, versus parameters estimated in a given window of time under consideration. Deviations by a certain threshold, which may be regulated according to a user-defined alarm rate, from historical parameters may indicate an anomalous path.

Some embodiments detect anomalous activity in a set of edges linked together in a k-path. A k-path may be a sequence of directed edges in a graph, such that the destination of the first edge is the source of the second edge, the destination of the second edge is the source of the third edge, and so on, such that the number of edges in the path is k. On each edge, data is associated. This data could be counts of connections between hosts on a computer network per unit time in some embodiments. All k-paths (for some fixed number k) may be enumerated, and sliding windows of time may be used to examine the data. Stochastic models may be built for each path, and historical parameters may be compared with current estimated parameters in the time window to determine the level of anomalousness.

Identifying anomalies in computer networks is generally a challenging and complex problem. Often, anomalies occur in extremely local areas of the network. Locality may be complex in this setting since there is an underlying graph structure. To identify local anomalies, a scan statistic may be used for data extracted from the edges of a graph over time. Two shapes may be especially beneficial for capturing locality in a graph: a star and the above-mentioned k-path. The use of the path as a scan window is novel. Both of these shapes are motivated by hacker behaviors observed in real network attacks.

To identify local anomalies, these shapes may be enumerated over the entire graph using a set of sliding time windows. Local statistics in each window may be compared with historic behavior to capture anomalies. These local statistics may be model-based, and, by way of example, two models used by some embodiments of the present invention motivated by network flow data are discussed herein to help demonstrate example scanning procedures. Data speeds on larger networks generally require online detection to be nimble. It may be desirable, therefore, for an anomaly detection system to achieve real-time analysis speed.

The detection of attackers once they are inside the network is of a high priority in cyber-security for the nation and for many organizations in general. It is extremely difficult, if not impossible, to keep attackers out of a network altogether. Traversal inside the network is very common among network attacks, and is a core requirement of many larger missions an attacker may wish to achieve, particularly where the attacker is working on behalf of a nation-state. Some embodiments of the present invention hold promise in detecting traversals, and have a tunable false positive parameter available to the system operator. In addition, some embodiments are designed to run in real-time, providing fast detection of attacks as they occur. Another key part of some embodiments of the present invention is a set of forensics tools that allow an analyst to fully explore the traversal(s) of an attacker, and identify hosts that may have been compromised.

In addition to anomalous path detection, some embodiments of the present invention observe DNS requests that are precursors to network traffic and infer subsequent network traffic from those requests. This inferred traffic can then be used for network reconnaissance, network situational awareness, and as a reliable source of data for network anomaly/change detection tools, including the subgraph detection tool described with respect to some embodiments of the present invention. In most organizations, one or two collection points field all DNS requests. The resulting data feed is generally smaller and easier to capture than data available from other common network collection mechanisms, such as router or network tap collection mechanisms. In addition, DNS generally provides more complete coverage of connection-level traffic since the alternative of tapping each router is prohibitively expensive, and router taps generally suffer from congestion-based sampling. Even traffic within sub-networks that cannot be seen by a router or tap may be inferred from a DNS request in many cases. This may be important in terms of anomaly detection since it is generally not unusual for a hacker to stay within a subnet.

For clarification, an anomalous scenario of an attack by a hacker that some embodiments of the present invention may detect is described. FIG. 1A illustrates a common initial stage 100 of an attack by a hacker. The hacker may achieve an initial attack by compromising a machine 102 on the network using malicious software. Compromised machine 102 is connected to ancillary machines 104 that are not connected to the traversal path. These machines are not necessarily clean, but they are not used for subsequent traversal in this example. One method for initially compromising a network is known as a phishing attack, where an email that includes a link to a malicious website is sent to a set of users on a network. When a user clicks on the link, his or her computing system may become compromised, giving the attacker some form of access to the user's computing system.

Figure 1B:
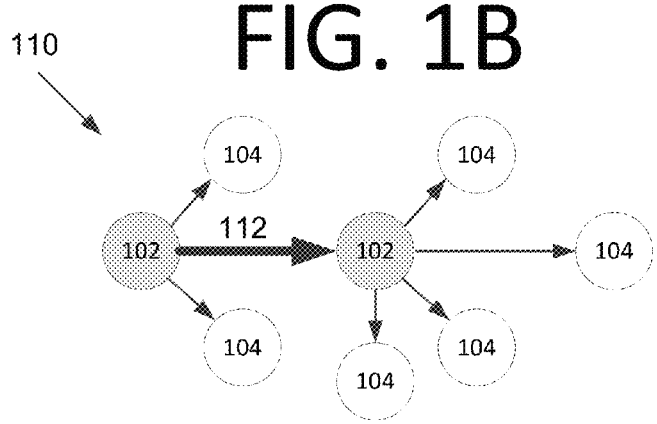
FIG. 1B illustrates a second stage of an attack by a hacker.
Figure 1C:
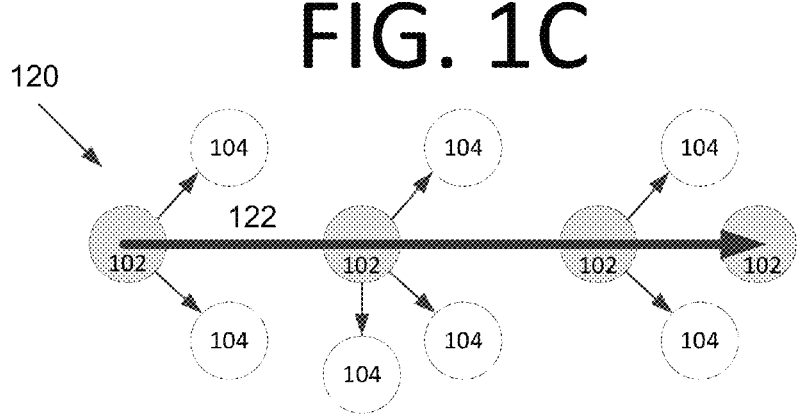
FIG. 1C illustrates a fourth stage of an attack by a hacker.

The attacker generally cannot dictate which computing system is compromised, and the initial host is usually not the ultimate target of the attack, if there even is an ultimate target. Instead, the hacker may wish to move to other computing systems in order to locate and exfiltrate valuable data, escalate privileges, and/or establish a broad presence in the network for later exploitation and/or resilience in the face of defensive measures made by network operators. Therefore, from this initial host, the attacker may proceed to other hosts, hopping from one to the next. FIG. 1B illustrates a second stage 110 of an attack by a hacker. Here, a second computing system 102 is compromised and compromised computing systems 102 are connected by a single edge 112. FIG. 1C illustrates a fourth stage 120 of an attack by a hacker where four computing systems 102 are compromised and compromised computing systems 102 are connected by a path 122.

As the attacker traverses the network, he or she creates anomalous activity in the time series of communications along each edge that he or she traverses. This means that additional communications will generally be seen over the historically normal communications levels for each edge. In some embodiments of the present invention, the union of these anomalous edges in some interval of time may be detected, and may describe an intrusion within the system.

Figure 2:
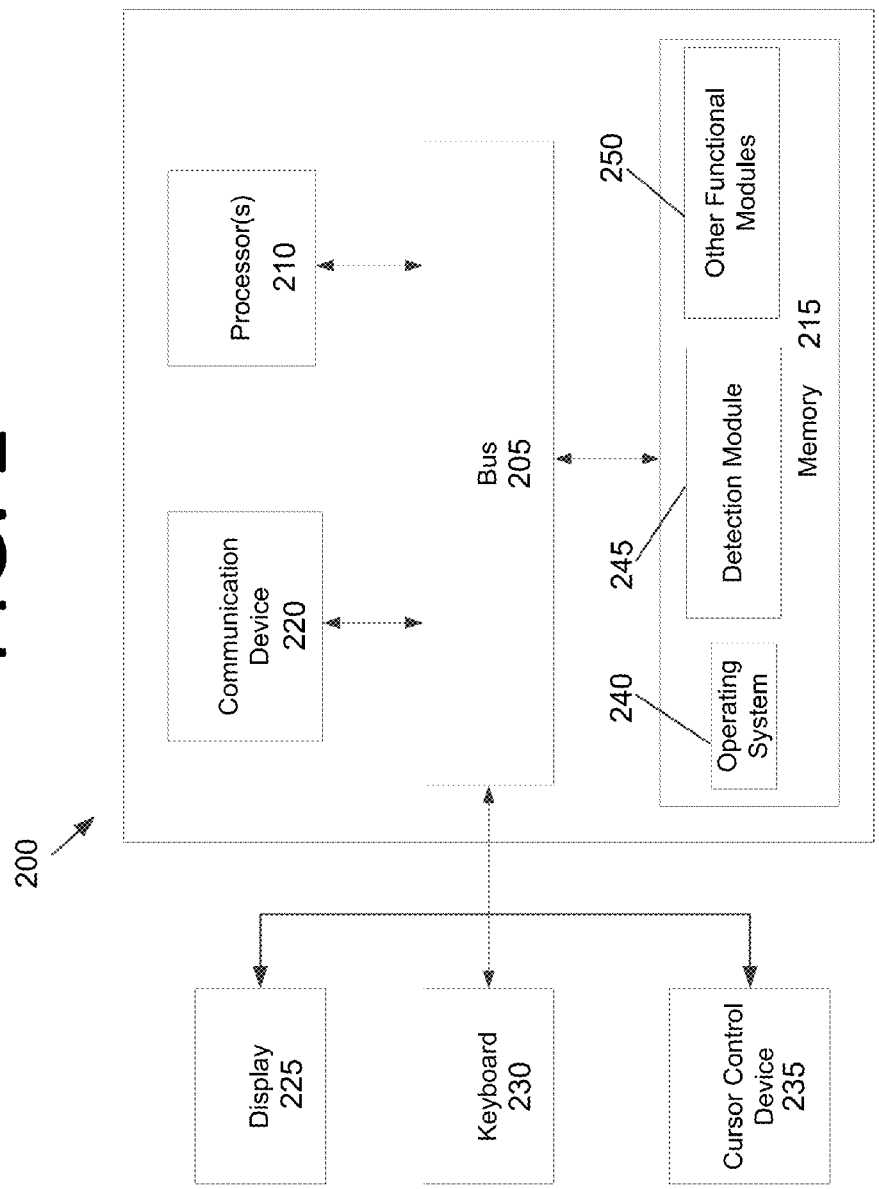
FIG. 2 illustrates a system for detecting intrusions, anomalies, and policy violations, according to an embodiment of the present invention.

FIG. 2 illustrates a computing system, or "system" 200 for detecting intrusions, anomalies, and policy violations, according to an embodiment of the present invention. System 200 includes a bus 205 or other communication mechanism for communicating information, and a processor 210 coupled to bus 205 for processing information. Processor(s) 210 may be any type of general or specific purpose processor, including a central processing unit ("CPU") or application specific integrated circuit ("ASIC"). Processor(s) 210 may also have multiple processing cores, and at least some of the cores may be configured to perform specific functions. Some embodiments may employ a multi-core, single machine approach known as Symmetric Multi-Processing ("SMP"). Other embodiments may be implemented across multiple machines, and each machine may have multiple cores. This approach is known as Message Passing Interface ("MPI"). System 200 further includes a memory 215 for storing information and instructions to be executed by processor(s) 210. Memory 215 can be comprised of any combination of random access memory ("RAM"), read only memory ("ROM"), flash memory, cache, static storage such as a magnetic or optical disk, or any other types of non-transitory computer-readable media or combinations thereof. Additionally, system 200 includes a communication device 220, such as a wireless network interface card, to provide access to a network.

Non-transitory computer-readable media may be any available media that can be accessed by processor(s) 210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 210 are further coupled via bus 205 to a display 225, such as a Liquid Crystal Display ("LCD"), for displaying information to a user. A keyboard 230 and a cursor control device 235, such as a computer mouse, are further coupled to bus 205 to enable a user to interface with system 200.

In one embodiment, memory 215 stores software modules that provide functionality when executed by processor(s) 210. The modules include an operating system 240 for system 200. The modules further include a detection module 245 that is configured to detect intrusions, anomalies, and policy violations. System 200 may include one or more additional functional modules 250 that include additional functionality.

One skilled in the art will appreciate that a "system" could be embodied as a personal computer, a server, a console, a personal digital assistant ("PDA"), a cell phone, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

When a hacker gains entry to a network, path and star anomalies may be observed. A star anomaly is indicative of a hacker using a compromised computing system to connect to other computing systems that it has access to, creating anomalies on multiple edges emanating from the compromised host.

A path anomaly may indicate a more subtle attack, which is a sequence of traversals from each host in the path to the next. The caterpillar anomaly is a mixture of stars and paths. This approach was designed to monitor a computer network in real time, and any scheme applied to computer network data at an enterprise-level (20,000 or more individual Internet Protocol ("IP") addresses) needs to be fast. Yet, in order to identify highly local anomalies, the system generally needs to monitor many small windows simultaneously. Some embodiments of the present invention are capable of examining a large number of local objects in a corporate-sized network in real-time.

Windows in the Cross Product Space

It may be useful to examine windows in the Time×Graph product space. These sets of windows may be defined such that there is a graph G=(V, E) with node set V and edge set E. For each edge e∈E, at discrete time points t∈{1, . . . , T}, there is a data process $X_e(t)$. The set of time windows on edges e over discretized time intervals (s, s+1, . . . , k) can be denoted as $\Omega=\{[e, (s, s+1, \ldots, k)]:e\in E, 0\leq s\leq k\leq T\}$. The set of all subsets of windows, $\Gamma=\{\{w_1, w_2, \ldots\}:w_j\in\Omega\}$, is usually very large, and only a subset thereof, $\Gamma_x \subset \Gamma$, that contains locality constraints in time and in graph space is generally of interest. Attention may generally be restricted, therefore, to sets of windows $\gamma\in\Gamma_x$. $\Gamma_x$ is usually problem-dependent. For convenience, $X(\gamma)$ may be denoted as the data in the window given by $\gamma$.

It may be assumed that for any time point t and edge e, $X_e(t)$ can be described with a stochastic process with parameter functions given by $\theta_e(t)$. The values of the parameter functions may be evaluated in the corresponding set of windows $\gamma$ by $\theta(\gamma)$. Finally, the likelihood of the stochastic process may be denoted on $\gamma$ as $L(\theta(\gamma)|X(\gamma))$.

A Scan Statistic for Windows in the Time×Graph Space

It is beneficial to know whether the data in a window could have been produced by a known function of the parameters $\hat{\theta}(\gamma)$, versus alternatives indicating that the parameters have changed. That is, given that it is observed that $X(\gamma)=x(\gamma)$, it may be beneficial to test $H_0$: $\theta(\gamma)=\hat{\theta}(\gamma)$ against alternatives that can be formed by restricting the overall parameter space, $\Theta$, to a subset $\Theta_A \subset \Theta$. The Generalized Likelihood Ratio Test ("GLRT") statistic may be a natural statistic to use. Let $$\lambda_\gamma = -2\log\left(\frac{L(\hat{\theta}(\gamma)|x(\gamma))}{\sup\{\theta \in \Theta_A\}L(\hat{\theta}(\gamma)|x(\gamma))}\right)$$

The size of $\lambda_\gamma$ depends on the number of parameters being tested in the window, which may make it difficult to use directly. To address this issue, $\lambda_\gamma$ may be normalized by converting it into a p-value, $p_\gamma$.

To scan for anomalies in the (Time×Graph) product space, it is generally required to slide over all windows $\gamma$, keeping track of the scan statistic $\psi=\min_\gamma p_\gamma$. In practice, thresholding must generally be done on the set of p-values, so more than just the minimum p-value should generally be considered. For online monitoring, the threshold on the p-values may be set to control the false discovery rate. The higher the threshold, the more anomalies that will be identified, but the more false positives as well. The threshold should generally be set such that an analyst running monitoring software is not overwhelmed. Generally, when a detection occurs, a set of windows (not just one) exceeds the threshold, so that the union of these windows is the detected anomaly produced by the system.

Local Shapes: Stars and Directed k-Paths

The approach discussed above can be used for batch (retrospective) or online (prospective) processing. However, graphs are generally combinatorial in nature. For a fully connected graph with n nodes, the number of subgraphs is $2^{n(n-1)}$. For practical applications, this large number of subgraphs may make using a restricted set of graph windows beneficial, particularly for online settings. Windows may be constructed that are appropriate for identifying specific shapes of anomalies.

Directed k-Paths

Since one common intrusion example is that of hacker traversal in a computer network, a specific type of subgraph for online monitoring may be particularly beneficial: directed k-paths. A directed k-path is a subgraph of size k, which has diameter k. Here, size is the number of edges in a graph, and diameter is the greatest hop-distance between any pair of nodes. Informally, this means that a k-path is a sequence of edges where the destination node of the current edge in the sequence is the source node of the next edge in the sequence, and so on.

The k-path has the advantage that it captures the core of many network attacks, since the attack may be described by a path through the network, with additional edges as "fuzz" around the core path. This attack shape has been observed in actual attacks. In addition, the k-path is highly local, allowing for the detection of small anomalies.

In some embodiments, 3-paths are used. 3-paths have the advantage of locality, but are also large enough to capture significant traversals. In order to scan every 3-path in the network graph, the paths are first enumerated. This can be non-trivial for many graphs. In a fully connected graph with n nodes, eliminating cycles and back edges, there are n(n−1)(n−2)(n−3) 3-paths.

In reality, a network graph is generally much less connected. However, in a 30 minute window of time, only including edges with non-zero activity in that window, a graph may be obtained that contains around 17,000 nodes, 90,000 edges, and 300 million 3-paths in an example embodiment. While the entire set of n(n−1)(n−2)(n−3) possible 3-paths may be effectively scanned, an anomaly measure is generally not calculated on any path with an edge that has no activity in the current time window. Since a hacker typically needs to make at least one communication to traverse an edge, no activity on an edge indicates no traversal over that edge, and the path containing the edge is therefore not considered anomalous (in the time window of interest).

Due to the large number of 3-paths, it is important to be able to enumerate paths quickly to maintain a near real-time response capability. An algorithm that enumerates k-paths may be found below. The parallelism is obtained by distributing the edges in the ENUMERATE for loop to a Message Passing Interface ("MPI")-based cluster. Each MPI node then computes recursively, from its edge list, all paths beginning at that edge. In this example, an edge A is a list of length 2, where A[1] is the source node and A[2] is the destination node.

```
function ENUMERATE(E, K):
// E = the list of edges representing a graph
// K = the integer length of paths to enumerate
for each edge A in E: // A is some edge in the graph
    list P[1] = A // A becomes the first edge in a path
    RECURSE(E, P, 1, K) // recursively append additional edges
function RECURSE(E, P, L, K):
// E = the list of edges representing a graph
// P = the list of edges representing a path
// L = the integer length of P
// K = the integer length of paths to enumerate
edge A = P[L] // A is the last edge in the path
for each edge B in E: // B is some edge in the graph
    if A[2] == B[1] then:
        P[L+1] = B // B becomes the last edge in the path
        if L+1 == K:
            EMIT(P) // a K-path was found
        else:
            RECURSE(E, P, L+1, K) // recursively append additional edges
```

This algorithm uses little memory, and is trivially parallelizable. In some real world simulations, 30 minute windows consisting of roughly 300 million paths were enumerated and tested in under 5 seconds per window using a 48 core commodity machine. This provides room to add complexity to the models, and to handle larger graphs than the already sizable graphs that are currently being analyzed, all while keeping up with real-time data streams.

Stars

Figure 3:
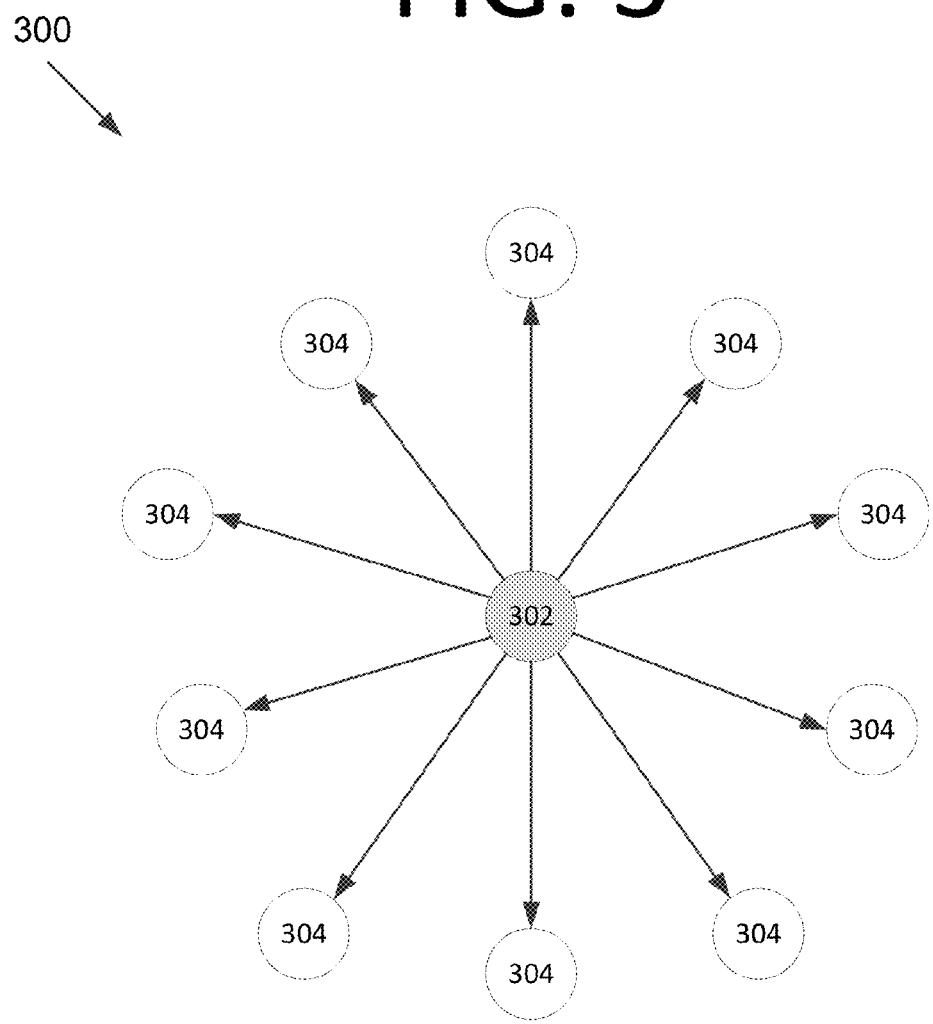
FIG. 3 illustrates an out-star.

Stars are another interesting shape for monitoring communication networks, as illustrated in out-star 300 of FIG. 3. Stars are defined as the set of edges whose source is a given central node. In FIG. 3, central node 302 is connected by directed edges to outer nodes 304. While these shapes are not very localized, especially for high out-degree nodes, they may still pick up star-type anomalies rather well. Paths have the ability to describe more subtle anomalies than star windows, but star windows generally outperform paths on large star anomalies.

Time Intervals

The time component may include the same interval of time over every edge in the graph window. This may detect anomalies that occur in the same time window for each edge in the shape. More elaborate options, such as sequential time windows or telescoping time windows, may be used to cater to specific protocols such as Secure Shell ("SSH").

Edge Data

Generally, it may be beneficial to model data at the resolution of edges rather than at the resolution of shapes γ. Two models are discussed that are motivated by the distribution of data on edges over time, including estimation, hypothesis testing, p-value calculation and thresholding.

IP addresses define nodes, and communications between IP addresses define the existence of a directed edge between those nodes in the graph. There may be enormous variety between edges in the network, and certain characteristics may be representative of where a human actor is present on the originating machine.

It is common in computer network data to observe a switching process. Intuitively, for many edges, this switching is caused by the human presence on the network. If a user is present at a machine, he or she may make non-zero counts on edges emanating from that machine. However, in many minutes, even though the user may be present, he or she may not be making non-zero counts on this edge since he or she may be communicating with some other machine, or not using the network at all. It is only known that when the user is not there, we will observe 0s on this edge. This presence/absence induces a switching process between a purely 0 count emission and a higher activity count emission. While, intuitively, there will be higher counts in the middle of the day than at night, homogeneous models may be used in some embodiments for the sake of model simplicity.

Independence of Edges in a Path

In order to scan for anomalous shapes, it is generally necessary to have models that describe the behavior of the data in the window under normal conditions. The number of enumerated subgraphs tends to scale exponentially with the number of nodes and an assumption of independence among the edges in the shape facilitates scaling the computations required to process graphs at line speeds, under reasonable memory requirements. This is generally because edge independence only requires models (and the storage of edge parameters) for each edge, whereas non-independence might require models for each shape, of which there may be many hundreds of millions, if not billions. Under the independence assumption, the path GLRT may be expressed as $$\lambda_\gamma = \sum_{e \in \gamma} \lambda_e$$

where $\lambda_e$ represents the GLRT scores on each edge in window γ.

Observed Markov Model ("OMM")

The first and simplest of the two models discussed herein is the two-state OMM, which may be denoted $B_t$. If there was a non-zero count in time bin t, then $B_t=1$, otherwise $B_t=0$. This model has two parameters, $p_{01}=P(B_t=0|B_{t-1}=1)$. Its likelihood is given by $$L(p_{01}p_{10}|b_1,\ldots,b_N)=(1-p_{01})^{n_{00}}p_{01}^{n_{01}}p_{10}^{n_{10}}(1-p_{10})^{n_{11}}$$

where $n_{ij}$ is the number of times that the consecutive pair $(b_i, b_j)$ was observed in the data. It may be assumed that the initial state is fixed and known. While this model captures the burstiness, it ignores the distribution of non-zero counts, and also does not allow for zeros to be produced in the high state. Maximum likelihood estimates for the OMM may be given by $$\hat{p}_{01} = \frac{n_{01}}{n_{00}+n_{01}} \text{ and } \hat{p}_{10} = \frac{n_{10}}{n_{10}+n_{11}}.$$

Hidden Markov Model ("HMM")

The HMM addresses the problems of the OMM discussed above. In some embodiments, a two-state HMM is employed with a degenerate distribution at zero for the low state and a negative binomial emission density in the high state. Negative binomial distribution densities do not suffer from the equidispersion property of the Poisson, and there is good justification for using them to monitor anomalies in network counts. While other models generally do not allow the high state to emit zeros, this model does. For instance, zero counts may be dispersed with on-zero data, but still may clearly be part of the "active" state. Intuitively, the active state is generally thought of as "the user is present at the machine," and therefore likely to make communications, not as "the user is making a communication on this edge."

The observed counts, $O_t$, follow a "hidden" two-state HMM, $Q_t$. The transition parameters are given by $p_{01}=P(Q_t=1|Q_{t-1}=0)$ and $p_{10}=P(Q_t=0|Q_{t-1}=1)$. The emission densities may be parameterized in each state as $b_0(O_t)=P(O_t|Q_t=0)=I(O_t=0)$ and $b_1(O_t)=P(O_t|\mu, s, Q_t=1)=NB(O_t|\mu, s)$ where $I(\bullet)$ is the indicator function and $NB(\bullet|\mu, s)$ is the Negative Binomial density function with mean $\mu$ and size s. The likelihood is given by $$L(p_{01}, p_{10}, \mu, p|O_1, \ldots, O_N) = \sum_{q_1} \ldots \sum_{q_N} b_{q_1}(O_1)p_{q_1 q_2}b_{q_2}(O_2) \ldots p_{q_{N-1} q_N}b_{q_N}(O_N)$$

HMM maximum likelihood estimates have no closed form, so an Estimation Maximization ("EM") approach may be used. At a set of T discrete time points, we may observe counts $x=[x_1, \ldots, x_T]'$, with $x_t \in \{0, 1, \ldots\}$ for $t=1, \ldots, T$. In this model, the counts are viewed as coming from one of two distributions, as governed by $Z=[Z_1, \ldots, Z_T]'$, a latent two-state Markov process. Letting $p_{01}=Pr(Z_n=1|Z_{n-1}=0)$ and $p_{10}=Pr(Z_n=0|Z_{n-1}=1)$, the latent transition matrix may be denoted as $$A = \begin{bmatrix} 1 - p_{01} & p_{01} \\ p_{10} & 1 - p_{10} \end{bmatrix}$$

The initial state distribution is denoted $\pi = Pr(Z_1=1)$.

The marginal distribution of the count at time t, given that $Z_t=0$ is degenerate at 0, i.e.

$$Pr(X_t = x_t | Z_t = 0) = I(X_t = 0)$$

where $I(\bullet)$ is the indicator function. When $Z_t=1$, it is assumed that the counts are distributed according to a negative binomial distribution with mean and size parameters given by $\phi=[\mu, s]'$, i.e.

$$Pr(X_t = x_t | Z_t = 1, \phi) = \frac{\Gamma(s + x_t)}{\Gamma(s)\Gamma(x_t+1)}\left(\frac{s}{\mu+s}\right)^s\left(\frac{\mu}{\mu+s}\right)^{x_t}$$

A useful fact is that the joint probability distribution over both latent and observed variables can be factored in a way that is useful for computation since it separates the different parameter types:

$$Pr(X = x, Z = z|\theta) = Pr(Z_1 = z_1|\pi) \prod_{t=2}^{T} Pr(Z_t = z_t|Z_{t-1} = z_{t-1}, A) \prod_{t=1}^{T} Pr(X_t = x_t|Z_t = z_t, \phi)$$

where $\theta=(\pi, A, \phi)'$. Finally, the likelihood is $$Pr(X = x|\theta) = \sum_{z_1=0}^{1} \ldots \sum_{z_t=0}^{1} Pr(X = X, Z = z|\theta)$$

Pooling and Estimation

In practice, many edges in a network may be very sparse, and therefore may not present much opportunity to observe high state counts. To perform estimation, edges may be pooled according to $\mu_e$, the average number of non-zero counts per day, averaged over a predetermined number of days. Two edge types may be defined in some embodiments.

Edge Type I ($\mu_e \geq 1$) consists of those edges for which sufficient data exists to estimate an individual model. In some model runs, this number has been ~45% of the edges for certain networks, although the percentage may vary. Maximum Likelihood Estimates ("MLEs") may be used for the parameters on these edges.

Edge Type II ($\mu_e < 1$) includes the remaining edges (~55% of the edges in certain networks) that share a common parameter set in order to "borrow" information across very sparse data. The set of edges $\tilde{e}$ is then extracted such that $\mu_{\tilde{e}}$ is among a predetermined number of the largest $\mu_e$ values in Edge Type II. In some embodiments, this number may be 1,000, for example. The parameters on each of these edges are estimated, and the mean of these parameter vectors is taken. The common edge model for Edge Type II may be parameterized by this mean vector. Taking the largest 1,000 $\mu_e$ values, for example, helps to ensure that the models are not overly sensitive on low count edges.

Alternative Hypotheses

In order to obtain a GLRT, it is generally necessary to restrict the overall parameter space to allow for alternatives that reflect the types of hacker behavior to be detected. These alternatives may intentionally be kept general in order to catch a variety of behaviors. It is postulated that hacker behavior causes increases to the MLEs of parameters governing the models. This is due to the fact that the hacker must act in addition to the normal behavior on that edge. Specifically, referring to the OMM, hacker behavior likely causes an increase in the probability of transitioning from the inactive to the active state: $H_0: p_{01} = \hat{p}_{01}$ versus $H_0: p_{01} > \hat{p}_{01}$, where $\hat{p}_{01}$ is the historic MLE.

In the HMM setting, more options are available. In some embodiments, three combinations of parameter changes are tested: $H_P: p_{01} > \hat{p}_{01}$, $H_M: \mu > \hat{\mu}$, and $H_B: p_{01} > \hat{p}_{01}$ where $\mu > \hat{\mu}$. In each case, the null hypothesis is that the parameter or two-parameter pair is equal to its historic MLE value.

p-Value Calculation and Threshold Determination

We seek a p-value for the observed GLRT statistic, $\lambda_\gamma$. Under mild regularity conditions, the GLRT is asymptotically $x^2$ with degrees of freedom equal to the number of free parameters in $\Theta$. However, this does not hold when the true parameters are not on the boundary of $\Theta$. If the true parameters are on the boundary, a point mass at zero in the distribution of $\lambda_\gamma$ will be obtained.

Star p-Values

The star is generally the simpler of the two shapes. The number of stars in a graph is the number of nodes, and therefore, for each node v, the distribution of the GLRT $\lambda_v = \sum_{e \in outedges(v)} \lambda_e$ can be modeled for the star around v. Let $\Lambda_v$ have the distribution of the $\lambda_v$. $\Lambda_v$ may be modeled as $\Lambda_v = B_v X_v$ where $B_v \sim$ Bernoulli $(p_v)$ and $X_v \sim$ Gamma $(\tau_v, \eta_v)$. Since all $\lambda_e$ in the sum could be zero, $\Lambda_v$ should have a point mass at zero. This may be captured by $B_v$. To model the positive part of the distribution for $\Lambda_v$, the Gamma distribution is attractive since it is equal to an $x^2$ distribution with degrees of freedom v when $$\tau_v = \frac{v}{2}$$

and $\eta_v=2$. The asymptotic distribution of $\lambda_v$ is the sum of independent zero inflated $x^2$ distributed random variables. Thus, the zero inflated Gamma is expected to be able to model the distribution of $\lambda_v$ fairly well. The log-likelihood of N independent, identically distributed samples is given by $$l(p, \tau, \eta) = \sum_{i=1}^{N} I(\lambda_i = 0)\log(1-p) + I(\lambda_i > 0)\left[(\tau-1)\log\lambda_i - \frac{\lambda_i}{\eta} - \log\Gamma(\tau) - \tau\log\eta\right]$$

To estimate $\tau_v$ and $\eta_v$, direct numerical optimization may be used. For example, this may be performed over 10 days of non-overlapping 30-minute windows for each star centered at node v in some embodiments as-tested. The MLEs may be denoted as $(\hat{p}_v, \hat{\tau}_v, \hat{\eta}_v)$. The for an observed $\lambda_v$, the upper p-value is calculated by $P(\Lambda_v > \lambda_v) = \hat{p}_v(1 - F_\Gamma(\lambda_v | \hat{\tau}_v, \hat{\eta}_v))$ where $F_\Gamma$ is the Gamma Cumulative Distribution Function ("CDF").

Path p-Values

Unlike stars, the large number of paths makes modeling $\lambda_\gamma$ for each path prohibitively expensive for many systems, both in computation time and memory requirements. Instead, a model may be built for each individual edge, and the edge models may be combined during the path likelihood calculation. For each edge e, let $\Lambda_e$ have the null distribution of the GLRT scores for e, $\lambda_e$. Again, a zero-inflated Gamma distribution may be used to model this. Now, however, it will only be on a per-edge basis. Once again, the model is motivated by the fact that asymptotically, the null distribution of $\lambda_e$ is a zero inflated $x^2$ (with 50% mass at zero if testing one parameter).

Let $\Lambda_e = B_e X_e$ where $B_e \sim $ Bernoulli $(p_e)$, and $X_e \sim $ Gamma $(\tau_e, \eta)$, with edge specific shape $\tau_e$ and shared scale $\eta$. That is, there are two free parameters for each edge, $p_e$ and $\tau_e$, and a common scale parameter for all edges $\eta$. MLEs $p_e$, $\tau_e$, and $\hat{\eta}$ may be estimated using $\lambda_e$s from non-overlapping 30 minute windows. The likelihood is similar to that discussed with respect to stars above, but since each edge has its own $\tau_e$, and a shared $\eta$, an iterative scheme has been developed that alternates between estimating $\eta$ for all edges, and then, for that fixed $\eta$, estimating an individual $\tau_e$. Since each step of the iteration increases likelihood, the overall procedure increases likelihood.

Once the edge models are fitted, path p-values may be calculated. Let $\Lambda_p = \tau_{e \in path} B_e X_e$. The 3-path exceedance p-value is the mixture exceedance given by $$P(\Lambda_p > \lambda_p) = \sum_{b_1=0}^{1}\sum_{b_2=0}^{1}\sum_{b_3=0}^{1} P(B_1 = b_1)P(B_2 = b_2)P(B_3 = b_3)P(\Lambda_p > \lambda_p | b_1, b_2, b_3)$$

$$= \sum_{b_1=0}^{1}\sum_{b_2=0}^{1}\sum_{b_3=0}^{1}\left(\prod_{i=1}^{3}(1-p_i)^{1-b_i}p_i^{b_i}\right)\left(1 - F_\Gamma\left(\lambda_p \bigg| \sum_{j=1}^{3}b_j\hat{\tau}_j, \hat{\eta}\right)\right)$$

using the fact that the sum of Gamma random variables with common scale parameters is again Gamma.

Threshold Determination

One way of determining thresholds is to simulate a certain period of per-minute counts for each edge with no anomalies introduced. For example, this may be performed for ten days. 30 minute windows, offset by ten minutes, may be slid over the ten days, calculating the minimum p-value in each window, just as would be done during a full scanning procedure. To achieve a certain false discovery rate, such as one alarm per day, the tenth smallest p-value in the resulting list of p-values may be taken, for example. Since the windows overlap, we may choose to be less conservative by counting minimum p-values resulting from consecutive windows on the same path as a single p-value, and find the tenth smallest minimum p-value associated with non-consecutive windows. In this way, alarms over several overlapping windows only contribute one alarm to the threshold determination, which is generally how an analyst would view a series of consecutive alarms.

Some embodiments of the present invention are directed to detecting anomalous activity using data defined over time on edges of an underlying graph structure. Since attacks can be very localized, some embodiments of the present invention window locally in the TimexGraph product space. A historic model is used to data in this local window is behaving as would be expected in accordance with historical behavior. k-paths may be particularly effective for detecting traversals through the network.

FIG. 4 is a flowchart 400 illustrating a method for detecting anomalous behavior on a network, according to an embodiment of the present invention. In some embodiments, the method of FIG. 4 may be performed at least in part, for example, by computing system 200 of FIG. 2. Historical parameters of a network are determined at 410 to determine normal activity levels. The historical parameters may include the number of connections on an edge at various time periods, for example. In some embodiments, the historical parameters may be established by taking into account two edge types—a first type where the member edges have sufficient data to estimate an individual model and a second type where there is not sufficient data to estimate individual models for the member edges. In certain embodiments, the second type of edges are parameterized by a mean vector to ensure that models are not overly sensitive to low count edges.

A plurality of paths in the network are enumerated at 420 as part of a graph representing the network. Each computing system may be a node in the graph and the sequence of connections between two computing systems may be a directed edge in the graph. A statistical model is applied to the graph on a sliding window basis at 430 to detect anomalous behavior. In some embodiments, an Observed Markov Model ("OMM") is used. In other embodiments, a Hidden Markov Model ("HMM") may be used. The OMM or HMM may be two-state models in some embodiments (e.g., "on", indicating user presence, and "off", indicating the user is not present). However, the approach of some embodiments does not necessarily depend on the model choice. Stated differently, various statistical models may be used in various embodiments. Data pertaining to the detected anomalous behavior is displayed to a user at 440.

Unified Host Collection Agent ("UHCA")

Host agents may be employed to defend a host by running security applications, such as antivirus software and firewalls. Host agents generally use a Unified Host Collection Agent ("UHCA") that uploads data from the host to a server for anomaly detection. However, some embodiments of the present invention use UHCA to provide data that may include network connections from the host to other machines, processes associated with the connections, executables associated with the processes, etc.

Conventionally, the data was collected from secondary server sources, instead of getting the data directly from the host. Some embodiments take this observed information into account to generate new events. Some embodiments also provide efficient aggregation of the data. The server may have one-way communication with the hosts where it receives messages from a large number of host agents. The lack of bidirectional communication in some embodiments adds to the efficiency.

Some embodiments use User Datagram Protocol ("UDP") since complete data collection is not required for effective operation in many embodiments. These embodiments may capture as much information as they can, but if some is missed, anomaly detection will generally still function effectively. This "lossy" collection approach allows the communication to be one-directional since packet delivery is not guaranteed in the manner implemented by TCP. This also allows for higher volumes of data than TCP-based approaches.

UDP streams may be encrypted so that network data is protected in some embodiments. Processing is a significant issue and management of data is difficult in large systems. Nonetheless, some embodiments are able to provide strong encryption and ensure privacy. The lossy nature of some embodiments helps to provide the extra processing required for security.

While UDP may be used, some embodiments also have the ability to detect packet loss using sequence numbering of packets. The Media Access Control ("MAC") address plus a sequence number may be used to track packets on a per-machine basis. This information can also be used independently of anomaly detection. For instance, the information can be used for forensics to look at data on a given host. Checksums of executables may be placed in a list to determine whether a particular host has malware, for example.

A weakness of most data collection infrastructures is limited visibility between internal nodes within the network. To improve the detection of attackers, end point visibility should be enhanced. Comprehensive end point visibility generally necessitates deploying software at the network host level. Not all network switches are capable of collecting network flow data at the subnet level. Likewise, DNS data viability typically suffers from caching and requires that adversaries use host names, as opposed to IP addresses, when establishing connections to target nodes.

To improve end point visibility, some embodiments employ a cross-platform software agent (hereinafter "the agent") that runs on various operating systems, such as Windows™, Mac OS X™, Linux™, Android™, etc. The UHCA may be written in Python in some embodiments, making it easy to adapt and extend to various target operating systems. However, any desired programming language or assembly code may be used. The agent's primary purpose may be data collection, and the agent may be designed to have minimal impact on the host operating system. Testing has shown that some embodiments of the agent use only 2-8% of a single CPU core. The agent may collect the system state and events and encode them as JavaScript Object Notation ("JSON") records called JSON Encoded Logs ("JELs"). In some embodiments, all JELs contain a generation time stamp, agent ID (e.g., the MAC address), agent IP address, operating system type, and record type (e.g., network connection state).

JELs may be forwarded in encrypted UDP packets to one or more central collection servers at relatively frequent (e.g., 1-5 minute) intervals. Multiple servers may be specified in the agent configuration file in some embodiments, allowing the system to scale horizontally. Collection capabilities of the agent may include process stop and start information with checksums of starting process images, network connection event logs, mapping of running processes to established network connections, and current network connection state.

Network Polling State

To detect anomalous paths, some embodiments take a list of triples (time, source IP address, destination IP address) of values indicating network communication between hosts. In order to extend such embodiments to leverage UHCA data, the agent should generally report uniform host network communication information across all of its target platforms. On Linux™, procfs (specifically /proc/tcp and /proc/udp) may be used to generate this data. OS X™ and Android™ implementations may parse the output of a call to netstat, although this is not an optimal approach. The Windows™ agent may use the Python ctypes Windows IP helper module's GetExtendedTcpTable method (ctypes.windll.iphlpapi.GetExtendedTcpTable), which provides network state information similar to procfs and netstat.

In some embodiments, data is polled every second, or any other desired period. Naturally, the more frequent the polling, the more data will be available for analysis, and the shorter the connection types that are likely to be captured. A drawback of polling every second is that short-lived (i.e., subsecond) connections will typically be missed by the agent. This may be an issue for many detection techniques, but the focus of some embodiments is to detect traversal of a network in an interactive manner. Even automated traversals would normally need greater than one second resolution to maintain state on target nodes.

To address the issue of short-lived connections being missed, using the TCP time wait state may be beneficial. When a client communicates with a server over TCP, the server maintains the state of the TCP connection. When the communication ends, the server must generally keep the connection information in the TIME_WAIT state for a period of time, commonly 30 seconds or more. This long time window allows the agent to capture information on sub-second network communications that otherwise would have been missed. In post-processing, testing is possible to see whether there were entries in time wait states that did not have corresponding established connection entries. Any such connections may be reported as short-lived connections.

Although some embodiments only require a list of triples, UHCA may send as much detail as possible about the network connection state back to the collection server to provide additional information for other applications. Data may be post-processed into triples using scripts for low-volume test data or map reduce for larger jobs, for example. Other fields in the network connection JELs may include source and destination port, state of the connection (established, listening, time wait, etc.), the process ID associated with the connection, and counts of the number of seconds that the connection was active within a one minute time window, or any other desired time window. Some embodiments may leverage the port information to better distinguish individual communications and use the count information to establish edge weights by collecting statistics from the counts, such as mean and variance, for the purpose of anomaly detection.

In testing, some embodiments incorporating UHCA have shown nearly twice the edge detection rate of some embodiments without UHCA. For example, in one test having 30 total edges, the embodiment without UHCA detected 14 out of 30 edges (46.7%), whereas the embodiment with UHCA detected 27 out of 30 edges (90%). The paths consisted of 15 name edges and 15 IP edges. This gives embodiments without UHCA a maximum theoretical detection rate of 50% and embodiments with UHCA a maximum theoretical detection rate of 100%.

FIGS. 5A-D below show sub-paths of four of the five test paths generated in the experiment. The first four edges from each path are displayed for consistency, even though some paths contain more edges. In all cases where edges are omitted, if the approach detected the last edge shown, then the approach continued to detect the remaining edges. If the approach failed to detect the last edge, then the approach continued to miss all remaining edges.

In FIGS. 5A-D, nodes (i.e., network hosts) are depicted as circles and edges (i.e., network communications) are depicted with either a line with a diamond end point (a name-edge) or an arrow end point (an IP-edge) pointing to the destination node. Bars labeled DNS and UHCA are used to indicate the detection length of each approach. Longer bars indicate longer detected paths. Short or missing bars highlight where the approach failed to detect edges in a path.

FIG. 5A is a path diagram 500 illustrating a path generated using only name-edges, according to an embodiment of the present invention. The path shows the detection results for a path with six edges (a 6-path), where all edges were generated with host name lookups. As predicted, this path was detected successfully by the non-UHCA DNS path detection approach (hereinafter "the DNS approach"). Surprisingly, the UHCA approach missed the first two edges in the path, although the UHCA approach picked up the path thereafter and detected the remaining four edges.

After analyzing the data in detail, it was determined that one host involved in the path (the second hop) functioned as an institutional server, constantly generating a large number of new connections. Since new edge behavior is modeled in some embodiments, the software expected this server to create new edges. Therefore, paths traversing through this server were deemed less anomalous, and did not exceed the alarm threshold. This is an exciting result, and justifies the use of the model of some embodiments versus simply determining all new paths (i.e., paths consisting entirely of new edges) as anomalous. Without such a model, all paths through this server would cause an alarm, increasing false alarm rates.

FIG. 5B is a path diagram 510 illustrating a path generated using only IP-edges, according to an embodiment of the present invention. The path is a 7-path generated entirely with IP-edges. This experiment behaved exactly as anticipated. The UHCA approach detected every edge, whereas the DNS approach did not detect any edges. The DNS approach simply cannot detect these types of paths since there is no DNS activity generated by these types of network traversals.

Figure 5C:
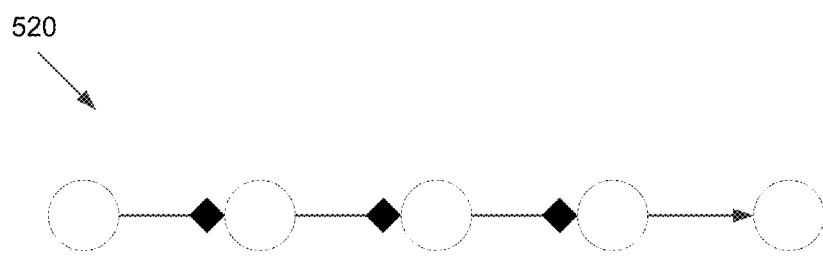
FIG. 5C is a path diagram illustrating a path beginning with three name-edges and ending with an IP-edge, according to an embodiment of the present invention.

FIG. 5C is a path diagram 520 illustrating a path beginning with three name-edges and ending with an IP-edge, according to an embodiment of the present invention. This was a 6-path where the first three edges were generated with name-edges while the last three edges were generated with IP-edges. The DNS approach was able to detect the first three edges as expected, but then failed to detect the IP-edges. The UHCA approach was able to detect the full path, as expected.

Another variant of this path was tested as well, but the results are not shown for the sake of brevity. In this 5-path, the path began with two IP-edges and then continued with three name-edges. The UHCA approach detected the entire path, while the DNS approach only detected the path after it switched to name-edges.

Figure 5D:
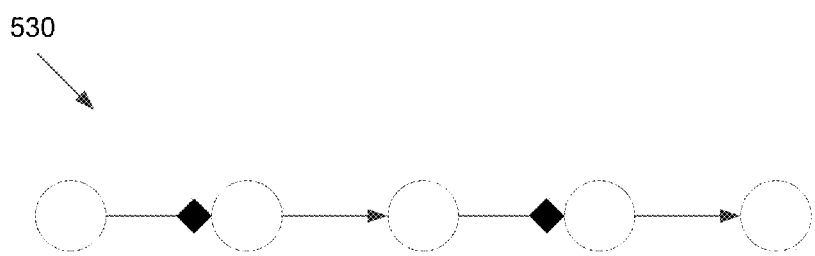
FIG. 5D is a path diagram illustrating a path with alternating name-edges and IP-edges, according to an embodiment of the present invention.

FIG. 5D is a path diagram 530 illustrating a path with alternating name-edges and IP-edges, according to an embodiment of the present invention. The path is a 6-path where the edges alternated between name-edges and IP-edges. The prediction was that this path would be undetectable to the DNS approach and fully detected by the UHCA approach. The UHCA approach did indeed detect the full path, but the DNS approach was able to detect the first edge of the path. Analysis of the data showed that this edge was part of an unrelated 3-path found by the DNS approach. The edge was coincidentally related to the edge chosen for this test path.

These initial results are encouraging as they validate the hypothesis that the UHCA approach can lead to improved attacker detection. The results also validate that the DNS approach is performing at close to expected detection rates.

Collecting Data Based on Anomalousness

It may not be possible to collect all available data on every host at all times, since such data volumes may be enormous, particularly in large networks. Instead, data may be collected proportionally to the level of anomalousness on that host as determined by anomaly detection methods such as those described herein. At a low level of anomalousness, basic network connectivity (such as DNS lookups) and process information may be collected. At a moderate level, more process accounting and services may be collected, along with more complete network behavioral data (such as NetFlow data). At a high level, full host behavior information, including process accounting, services, open files, etc., along with full packet capture for network visibility, may be collected. In some cases, this may only be done in local areas of the network, and, again, would be driven by anomaly detection. This would provide higher quality detection capability on those hosts, but also provide high quality forensic information for analysts who respond to the anomaly.

In some embodiments, anomaly levels may be determined by path traversal methods described herein. Paths traversing through nodes may be deemed as only slightly anomalous according to the current data being collected at each node. If, however, the nodes in this path were behaving with a moderate level of anomalousness, more comprehensive data may be collected at each host in the path. This may be fed back into the algorithm to provide better fidelity, and the algorithm could then make higher quality decisions about this path (e.g., lower false positive rates and higher true positive rates). If the new, higher fidelity data continues to be deemed anomalous, full packet capture and process accounting may be enabled at the hosts, providing both high quality anomaly detection data and full forensic data for use by security response personnel.

FIG. 6 is a flowchart 600 of a method for using UHCA to collect data pertaining to anomalies, according to an embodiment of the present invention. In some embodiments, the method of FIG. 6 may be performed at least in part, for example, by computing system 200 of FIG. 2. The method begins with periodically polling a plurality of host agents for data at 610. The data is collected from the plurality of host agents pertaining to network communications sent and received by respective hosts in a network at 620. In some embodiments, the collected data may be sent as one-way communications from the host agents via UDP. The data collected for each host may include process stop and start information with checksums of starting process images, network connection event logs, a mapping of running processes to established network connections, and a current network connection state. The collected data may include a list of triples of values indicating network communication between hosts, and each triple may include a time when the communication occurred, a source IP address, and a destination IP address.

In some embodiments, the data may be collected proportionally to a level of anomalousness on a respective host. At a low level of anomalousness, as deemed by deviation from a baseline probabilistic approach, the basic network connectivity and process information may be collected. At a moderate level of anomalousness, more process accounting and services and more complete network behavioral data may be collected. At a high level of anomalousness, full host behavioral information may be collected and full packet capture may be performed.

The collected data is analyzed to detect anomalous behavior during a predetermined time period at 630. TCP wait states are used to detect short duration connections at 640, and count weights are established using count information at 650. When anomalous behavior is detected, an indication that the anomalous behavior occurred during the predetermined time period is provided at 660.

The method steps performed in FIGS. 4 and 6 may be performed by a computer program product, encoding instructions for the nonlinear adaptive processor to perform at least the methods described in FIGS. 4 and 6, in accordance with an embodiment of the present invention. The computer program product may be embodied on a computer readable medium. A computer readable medium may be, but is not limited to, a hard disk drive, a flash device, a random access memory, a tape, or any other such medium used to store data. The computer program product may include encoded instructions for controlling the nonlinear adaptive processor to implement the methods described in FIGS. 4 and 6, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with elements in configurations different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   determining, by a computing system, historical parameters of a network to determine normal activity levels;
   enumerating, by the computing system, a plurality of k-paths in the network as part of a graph representing the network, wherein each computing system in the network comprises a node in the graph and a sequence of connections between two computing systems comprise a directed edge in the graph;
   applying, by the computing system, a Markov edge resolution model to the plurality of k-paths in the graph on a sliding window basis; and
   detecting, by the computing system, anomalous behavior based on the applied Markov edge resolution model.

2. The computer-implemented method of claim 1, further comprising:
   displaying data pertaining to the detected anomalous behavior to a user.

3. The computer-implemented method of claim 1, wherein the Markov edge resolution model comprises an Observed Markov Model ("OMM") or a Hidden Markov Model ("HMM").

4. The computer-implemented method of claim 3, wherein
   the OMM or the HMM comprise two-state models,
   an "on" state indicates user presence, and
   an "off" state indicates that the user is not present.

5. The computer-implemented method of claim 1, wherein the computing system determines the historical parameters by taking into account at least two edge types.

6. The computer-implemented method of claim 5, wherein a first edge type comprises member edges having sufficient data to estimate an individual model, and a second edge type comprises member edges where there is not sufficient data to estimate individual models for the member edges.

7. The computer-implemented method of claim 6, wherein the second edge type is parameterized by a mean vector to ensure that models are not overly sensitive to low count edges.

8. The computer-implemented method of claim 1, further comprising:
collecting data, by the computing system, from a plurality of host agents pertaining to network communications sent and received by respective hosts in the network; and
analyzing the collected data to detect anomalous behavior during a predetermined time period.

9. An apparatus, comprising:
at least one processor; and
memory storing computer program instructions, wherein the instructions, when executed by the at least one processor, are configured to cause the at least one processor to:
determine historical parameters of a network to determine normal activity levels,
enumerate a plurality of k-paths in the network as part of a graph representing the network, wherein each computing system in the network comprises a node in the graph and a sequence of connections between two computing systems comprises a directed edge in the graph,
apply a statistical model to the plurality of k-paths in the graph on a sliding window basis, and
detect anomalous behavior based on the applied statistical model.

10. The apparatus of claim 9, wherein the computer program instructions are further configured to cause the at least one processor to display data pertaining to the detected anomalous behavior to a user.

11. The apparatus of claim 9, wherein the statistical model comprises an Observed Markov Model ("OMM") or a Hidden Markov Model ("HMM").

12. The apparatus of claim 11, wherein
the OMM or the HMM comprise two-state models,
an "on" state indicates user presence, and
an "off" state indicates that the user is not present.

13. The apparatus of claim 9, wherein the computer program instructions are further configured to cause the at least one processor to determine the historical parameters by taking into account at least two edge types.

14. The apparatus of claim 13, wherein a first edge type comprises member edges having sufficient data to estimate an individual model, and a second edge type comprises member edges where there is not sufficient data to estimate individual models for the member edges.

15. The apparatus of claim 14, wherein the second edge type is parameterized by a mean vector to ensure that models are not overly sensitive to low count edges.

16. The apparatus of claim 9, wherein the computer program instructions are further configured to cause the at least one processor to:
collect data from a plurality of host agents pertaining to network communications sent and received by respective hosts in the network, and
analyze the collected data to detect anomalous behavior during a predetermined time period.

17. A system, comprising:
memory storing computer program instructions configured to detect anomalous behavior in a network; and
a plurality of processing cores configured to execute the stored computer program instructions, wherein the plurality of processing cores is configured to:
determine historical parameters of a network to determine normal activity levels,
enumerate a plurality of k-paths in the network as part of a graph representing the network, wherein each computing system in the network comprises a node in the graph and a sequence of connections between two computing systems comprise a directed edge in the graph,
apply a statistical model to the plurality of k-paths in the graph on a sliding window basis, and
detect anomalous behavior based on the applied statistical model.

18. The system of claim 17, wherein the plurality of processing cores are further configured to display data pertaining to the detected anomalous behavior to a user.

19. The system of claim 17, wherein the statistical model comprises an Observed Markov Model ("OMM") or a Hidden Markov Model ("HMM").

20. The system of claim 19, wherein
the OMM or the HMM comprise two-state models,
an "on" state indicates user presence, and
an "off" state indicates that the user is not present.

21. The system of claim 17, wherein
the plurality of processing cores are further configured to determine the historical parameters by taking into account at least two edge types,
a first edge type comprises member edges having sufficient data to estimate an individual model, and
a second edge type comprises member edges where there is not sufficient data to estimate individual models for the member edges.

22. The system of claim 21, wherein the second edge type is parameterized by a mean vector to ensure that models are not overly sensitive to low count edges.

23. The system of claim 17, wherein the plurality of processing cores are further configured to:
collect data from a plurality of host agents pertaining to network communications sent and received by respective hosts in the network, and
analyze the collected data to detect anomalous behavior during a predetermined time period.

24. A computer-implemented method, comprising:
collecting data, by a computing system, from a plurality of host agents pertaining to network communications sent and received by respective hosts in a network;
analyzing, by the computing system, the collected data to detect anomalous behavior during a predetermined time period by applying a statistical model to a plurality of k-paths in a graph on a sliding window basis; and
when anomalous behavior is detected, providing, by the computing system, an indication that the anomalous behavior occurred during the predetermined time period.

25. The computer-implemented method of claim 24, wherein the collected data is sent as one-way communications from the host agents via User Datagram Protocol ("UDP").

26. The computer-implemented method of claim 24, wherein the data collected for each host comprises process stop and start information with checksums of starting process images, network connection event logs, a mapping of running processes to established network connections, and a current network connection state.

27. The computer-implemented method of claim 24, wherein the collected data comprises a list of triples of values indicating network communication between hosts, each triple comprising a time when the communication occurred, a source Internet Protocol ("IP") address, and a destination IP address.

28. The computer-implemented method of claim 24, wherein the collecting of the data further comprises periodically polling the host agents for the data.

29. The computer-implemented method of claim 24, further comprising:
 using, by the computing system, a Transmission Control Protocol ("TCP") time wait state to collect information on short duration connections.

30. The computer-implemented method of claim 24, further comprising:
 establishing, by the computing system, count weights using count information by calculating mean and variance statistics on the counts.

31. The computer-implemented method of claim 24, wherein the data is collected proportionally to a level of anomalousness on a respective host,
 at a low level of anomalousness, as deemed by deviation from a baseline probabilistic approach, the computing system collects basic network connectivity and process information,
 at a moderate level of anomalousness, the computing system collects more process accounting and services and more complete network behavioral data, and
 at a high level of anomalousness, the computing system collects full host behavioral information and performs full packet capture.

\* \* \* \* \*